(No Model.)
N. BARRY, Jr.
LEAD PIPE JOINT OR SOLDERING NIPPLE.
No. 497,622.   Patented May 16, 1893.
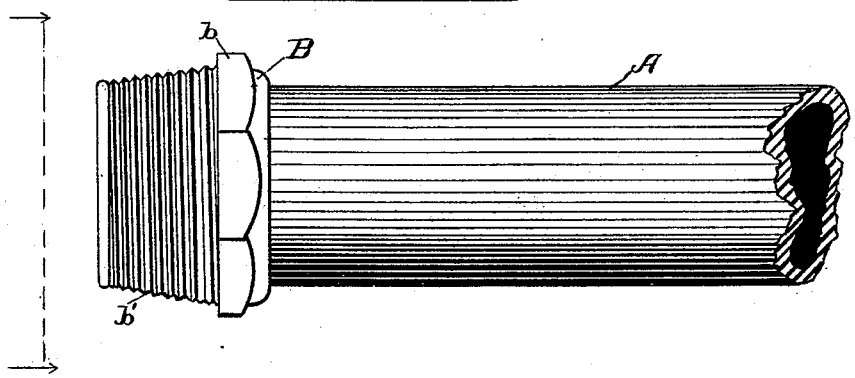
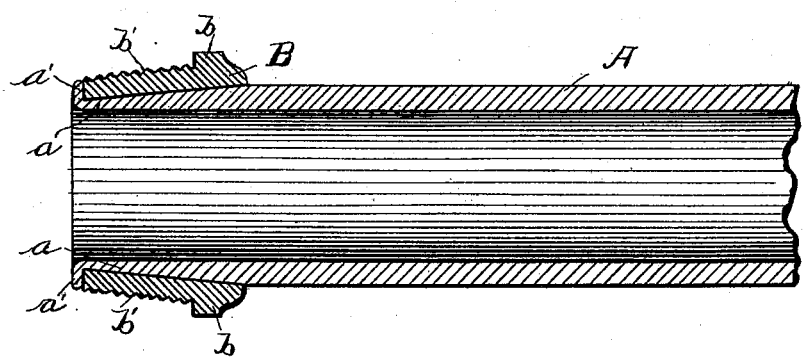
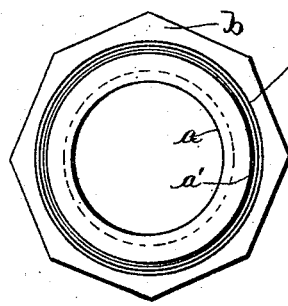
Witnesses
James B. Mansfield.
C. W. Sevills.
Inventor
Nicholas Barry Jr.
By his Attorneys
Alexander & Dowell

UNITED STATES PATENT OFFICE.

NICHOLAS BARRY, JR., OF MUSCATINE, IOWA.

LEAD-PIPE JOINT OR SOLDERING NIPPLE.

SPECIFICATION forming part of Letters Patent No. 497,622, dated May 16, 1893.

Application filed April 4, 1892. Serial No. 427,713. (No model.)

*To all whom it may concern:*

Be it known that I, NICHOLAS BARRY, Jr., of Muscatine, in the county of Muscatine and State of Iowa, have invented certain new and useful Improvements in Lead-Pipe Joint or Soldering Nipples; and I do hereby declare that the following is a full, clear, and exact description thereof, reference being had to the accompanying drawings, and to the letters of reference marked thereon, which form part of this specification, in which—

Figure 1 represents a section of lead pipe provided with my improved nipple. Fig. 2 is a longitudinal sectional view of the nipple and pipe; Fig. 3, an end view of nipple.

This invention is an improvement in lead pipe couplings, and "nipples" for lead pipes, and its object is to improve the construction and manner of attaching nipple to the lead pipe, and it consists in the novel construction of the nipple and fitting of pipe thereto, as will be clearly understood from the following description and claims—

Referring to the drawings by letter, A represents a piece of lead pipe, and B the nipple, preferably of brass or other hard metal. This nipple is conical both externally and internally, so that the walls thereof are of approximately equal thickness throughout its length, except at its larger end which is exteriorly flanged or shouldered as at $b$ to form a "nut flange." It is exteriorly threaded as at $b'$ to engage the interiorly threaded pipe or nipple, &c., to which the pipe A is to be connected. Externally the nipple resembles those in ordinary use, but is different therefrom because its walls are of the same thickness throughout, and its bore conical.

It is desirable to have the pipe B of equal diameter throughout, and to fit the nipple closely on, and not in, the end thereof. In such construction the walls of the nipple are reduced in thickness so that the threads on the smaller end thereof are much weaker than at the larger end, because the walls are wedge-shaped or triangular in cross section, whereas in my nipple it will be observed that the walls are rectangular in cross section and of equally approximate thickness throughout the entire threaded portion. In order therefore to preserve the equality of the bore of the pipe and to fit the nipple thereto neatly, I exteriorly taper the end of the pipe on which the nipple is to be secured as shown at $a$. The tapered end of pipe A fits closely within and projects slightly beyond the nipple, and is turned over and flanged against the smaller end of nipple as shown at $a'$. The nipple is thus closely confined to the pipe by means of the opposite tapers of the pipe and nipple and by the flange $a'$ so that it cannot move longitudinally thereon. Then to make a perfectly secure and tight joint between the nipple and pipe I either wipe the joint with solder in the well known manner, or preferably dip the nipple-end of pipe into molten solder which fills up any possible crevices between the nipple and pipe and securely unites them. It will be observed by reference to the drawings that the bore of the pipe is straight clear through the nipple, and that the latter is not weakened, nor is the pipe weakened so as to affect the durability thereof as it tapers toward the outer end of nipple, and is of full thickness at the inner end thereof. By this construction the danger of the threads on the nipple yielding because of the reduced thickness of the walls thereof is obviated, and that no joints, crevices or shoulders are formed or left within the pipe, which is perfectly true and smooth.

Another and very important feature of this joint or nipple connection is that it enables the pipe to be bent close to the nipple without breaking away therefrom as the walls of the pipe at the inner end of nipple are of full thickness. Ordinarily where the joint between the nipple and pipe is formed by slipping the nipple over the pipe and the nipple is of standard gage it is necessary to reduce the thickness of pipe so as to make its bore even throughout. This weakens the pipe at the point of junction with nipple so that if it is bent it either breaks, away from the nipple, or ruptures owing to the weakness of the walls of the nipple. Where the nipple has an exteriorly tapered end which fits into the pipe it of course cannot be bent except at the extremity of tapered portion, an inch or more from the threads of nipple, and at the same time the portion of nipple within the pipe makes it rough and in bending, the pipe sometimes breaks through it. By my construction however the thickness of the pipe is maintained clear up to the nipple, the diameter of the bore is unbroken, and the pipe can be bent as shortly at the nipple as at any other portion of its length.

I am aware of C. Gumlich, Jr.'s, patent, No. 212,599, dated February 25, 1879, for a swivel joint hose attachment for street washers, and disclaim all shown therein, as my nipple is different in construction and application.

Having thus described my invention, what I claim as new, and desire to secure by Letters Patent thereon, is—

1. In a soldering nipple joint or lead pipe, the combination of a nipple having a conical bore, and a conical exterior screw-threaded substantially as described, its threaded portion being of equal thickness throughout; with a pipe having its end exteriorly tapered to fit in the nipple, and its reduced extremity flanged over or against the end of nipple, said pipe and nipple being permanently and relatively immovably secured together, substantially as described.

2. The herein described lead pipe nipple connection, consisting of a hard metal nipple having a conically tapered screw threaded portion, and a conical bore within the tapered portion, so that the walls of the screw threaded part are of equal thickness throughout, and an exterior flange at its larger end, in combination with a soft metal pipe having its end exteriorly tapered and fitted within the nipple and permanently secured thereto substantially as described so that it is immovable independently thereof, whereby the bore of the pipe is unbroken and of equal diameter throughout and the exterior wall of the pipe at its junction with nipple of uniform thickness with the body thereof, as and for the purpose specified.

In testimony that I claim the foregoing as my own I affix my signature in presence of two witnesses.

NICHOLAS BARRY, JR.

Witnesses:
JAMES R. MANSFIELD,
C. W. SEVILLE.